No. 42,880.       PATENTED MAY 24, 1864.
J. SCHNITZER.
DOUBLE GLOBE LENS.
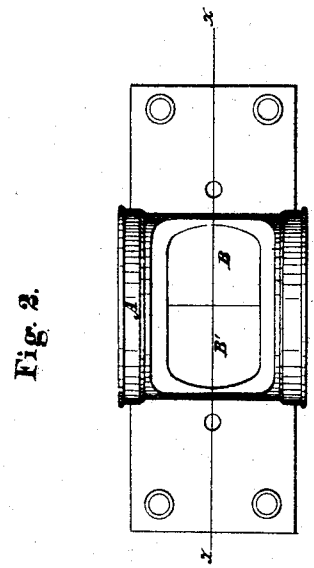
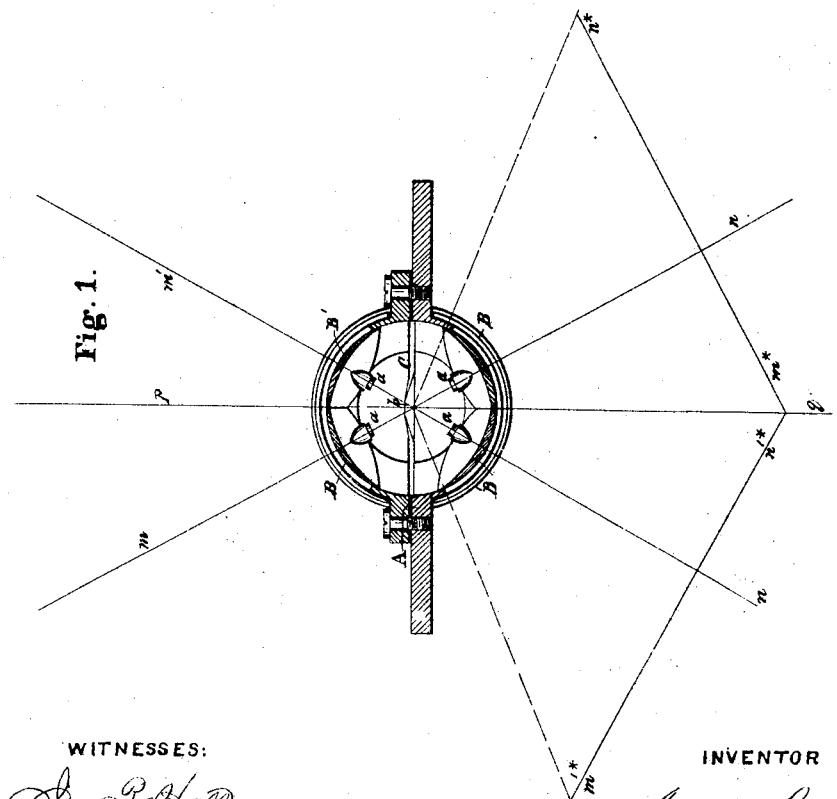
WITNESSES:         INVENTOR
                   Joseph Schnitzer.

UNITED STATES PATENT OFFICE.

JOSEPH SCHNITZER, OF NEW YORK, N. Y.

DOUBLE-GLOBE LENS.

Specification forming part of Letters Patent No. 42,880, dated May 24, 1864.

*To all whom it may concern:*

Be it known that I, JOSEPH SCHNITZER, of the city, county, and State of New York, have invented a new and Improved Double-Globe Lens with Cross-Axes; and I do hereby declare that the following is a full, clear, and exact description thereof, which will enable others skilled in the art to make and use my invention, reference being had to the accompanying drawings, forming a part of this specification, in which—

Figure 1 represents a horizontal section of my invention, taken in the plane indicated by the line $x\,x$, Fig. 2. Fig. 2 is a side elevation of the same.

Similar letters of reference indicate corresponding parts in the several figures.

This invention consists in a lens composed of two pairs of spherical segments arranged on opposite sides of a diaphragm in a cylindrical case and placed together under a certain angle in such a manner that the axis of one pair of segments makes an angle of sixty degrees, more or less, with the axis of the other pair of segments, and that by inserting this lens in a photographic camera two pictures can be taken simultaneously of the opposite sides of a street or of different parts of a landscape on glass or other material placed in the proper position behind the lens.

A represents a case made of brass or other suitable material and arranged in such a manner that the spherical segments B B' can be conveniently secured in the same in the position as shown in Fig. 1 of the drawings. Each of these segments forms a portion of a square, and they are fastened in the cylindrical case A by means of buttons $a$; but I do not wish to confine myself to this precise construction of the case or to the means of fastening the segments shown in the drawings.

C is a diaphragm, which divides the case A in two equal parts, each part to contain two segments. This diaphragm is composed of a piece of brass or other suitable material, with an oblong hole, $b$, in the center to allow the rays of light from the segment B or B' in one part of the case A to pass to the corresponding segment in the other part, but the rays of light admitted through the segments B are not allowed to pass to the segments B', and vice versa. Each pair of segments B and B' forms a distinct lens, the axis of which makes an angle of about sixty degrees, more or less, with the axis of the other lens, as clearly shown in Fig. 1, where the line $m\,n$ indicates the axis of the segments B, and the line $m'\,n'$ the axis of the segments B'. The plane indicated by the line $p\,q$ may be called the "neutral plane," and all rays of light striking the lens on one side of the neutral plane pass through the segments B, and those rays which strike the lens on the opposite side of the neutral plane pass through the segments B'.

By this arrangement of the axes of my lens I am enabled to take simultaneously two pictures of the opposite sides of a street or of different parts of a landscape or other subject on two planes, $m^*\,n^*\,m'^*$ , placed at right angles to the axes $m\,n\,m'\,n'$, and at the proper distance behind the lens. The two pictures taken in that manner at the same instant form, in fact, one picture, and I am enabled to produce pictures which cover a much larger area than pictures taken with a lens of the ordinary construction, and which, from the peculiar angle under which they are taken, give quite a peculiar effect.

What I claim as new, and desire to secure by Letters Patent, is—

A lens composed of two or more pairs of segments, B B', which are arranged on opposite sides of a diaphragm C in the case A, substantially in the manner and for the purpose herein shown and described.

JOSEPH SCHNITZER.

Witnesses:
M. M. LIVINGSTON,
C. L. TOPLIFF.